(12) United States Patent
Lee et al.

(10) Patent No.: US 11,474,692 B2
(45) Date of Patent: Oct. 18, 2022

(54) ELECTRONIC DEVICE INCLUDING DISPLAY ON WHICH EXECUTION SCREEN FOR MULTIPLE APPLICATIONS IS DISPLAYED, AND METHOD FOR OPERATION OF ELECTRONIC DEVICE

(71) Applicant: Samsung Electronics Co., Ltd., Gyeonggi-do (KR)

(72) Inventors: Sangeun Lee, Gyeonggi-do (KR); Dasom Kim, Gyeonggi-do (KR); Joonhwan Kim, Gyeonggi-do (KR); Jieun Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/058,733

(22) PCT Filed: Apr. 29, 2019

(86) PCT No.: PCT/KR2019/005127
§ 371 (c)(1),
(2) Date: Nov. 25, 2020

(87) PCT Pub. No.: WO2020/017743
PCT Pub. Date: Jan. 23, 2020

(65) Prior Publication Data
US 2021/0216204 A1 Jul. 15, 2021

(30) Foreign Application Priority Data
Jul. 17, 2018 (KR) .......................... 10-2018-0083187

(51) Int. Cl.
*G06F 3/048* (2013.01)
*G06F 3/04886* (2022.01)
(Continued)

(52) U.S. Cl.
CPC ........ *G06F 3/04886* (2013.01); *G06F 3/0486* (2013.01); *G09G 3/035* (2020.08); *G09G 2360/04* (2013.01)

(58) Field of Classification Search
CPC ... G06F 3/04886; G06F 3/0486; G09G 3/035; G09G 2360/04
See application file for complete search history.

(56) References Cited

U.S. PATENT DOCUMENTS 10,191,556 B2 1/2019 Lazaridis et al.
10,387,014 B2 * 8/2019 Kim .................... G06F 3/04845
(Continued)

FOREIGN PATENT DOCUMENTS

KR 10-2020-0022574 A 3/2020

*Primary Examiner* — Carolyn R Edwards
(74) *Attorney, Agent, or Firm* — Cha & Reiter, LLC

(57) ABSTRACT

The present invention provides an electronic device including a display and a processor operationally connected with the display to control the display. The processor displays a first execution screen corresponding to a first application on a main region, displays a second execution screen corresponding to a second application, on a first sub-region among a plurality of sub-regions displaying execution screens corresponding to a plurality of applications other than the first application, and increases a size of the first sub-region based on an input to the second application to display the increased first sub-region as an expanded first sub-region. The expanded first sub-region is overlapped with at least a portion of the main region and/or at least a portion of a second sub-region which is a sub-region other than the first sub-region, and the expanded first sub-region is visually displayed as an upper layer than the main region and the second sub-region. In addition to the above, various embodiments identified through the specification are possible.

10 Claims, 14 Drawing Sheets

(51) Int. Cl.
    *G09G 3/00*    (2006.01)
    *G06F 3/0486*    (2013.01)

(56) References Cited

U.S. PATENT DOCUMENTS

| | | |
|---|---|---|
| 10,649,538 B2 | 5/2020 | Lazaridis et al. |
| 2003/0197739 A1 | 10/2003 | Bauer |
| 2010/0182265 A1* | 7/2010 | Kim ...................... G06F 1/1641 345/1.3 |
| 2012/0184247 A1* | 7/2012 | Choe ...................... H04M 1/67 455/411 |
| 2013/0117718 A1 | 5/2013 | Lazaridis et al. |
| 2013/0120295 A1* | 5/2013 | Kim ...................... G06F 3/0486 345/173 |
| 2013/0229324 A1* | 9/2013 | Zhang ................... G06F 1/1641 345/1.3 |
| 2013/0305184 A1 | 11/2013 | Kim et al. |
| 2014/0111954 A1 | 4/2014 | Lee et al. |
| 2014/0189566 A1* | 7/2014 | Kim ........................ G06F 3/013 715/773 |
| 2014/0285449 A1* | 9/2014 | Cho ...................... G06F 3/0416 345/173 |
| 2014/0285450 A1 | 9/2014 | Cho et al. |
| 2014/0337793 A1* | 11/2014 | Han .................... G06F 3/04883 715/788 |
| 2015/0015525 A1 | 1/2015 | Cho et al. |
| 2015/0309691 A1* | 10/2015 | Seo .................... H04M 1/0241 345/173 |
| 2016/0357221 A1* | 12/2016 | Huh ...................... G06F 3/0346 |
| 2019/0026064 A1* | 1/2019 | Jeon ........................ G09G 5/14 |

* cited by examiner

ELECTRONIC DEVICE INCLUDING DISPLAY ON WHICH EXECUTION SCREEN FOR MULTIPLE APPLICATIONS IS DISPLAYED, AND METHOD FOR OPERATION OF ELECTRONIC DEVICE

CROSS REFERENCE TO RELATED APPLICATIONS

This application is a National Phase Entry of PCT International Application No. PCT/KR2019/005127, which was filed on Apr. 29, 2019, and claims a priority to Korean Patent Application No. 10-2018-0083187, which was filed on Jul. 17, 2018, the contents of which are incorporated herein by reference.

TECHNICAL FIELD

Embodiments of the present disclosure relate to a technology for improving a display method for execution screens of a plurality of applications in an electronic device.

BACKGROUND ART

Electronic devices with displays have been widely spread. The electronic device may display an execution screen of an application being executed by the electronic device by using a display.

Electronic devices such as smartphones and tablets generally output an execution screen of one application on the entire display region. Meanwhile, electronic devices that support functions such as a multi-window mode or a multi-screen mode may normally divide the display into two regions and may output execution screens of different applications in each of the divided regions.

DISCLOSURE OF THE INVENTION

Technical Problem

When the electronic device operates in the multi-window mode, a region acquiring a focus among a plurality of regions may be expressed in a way in which the region acquiring the focus is specified with a different color. For example, the region acquiring the focus may be visually distinguished by using a color point. However, even if any one region of the electronic device acquires a focus, a user may not easily recognize the region acquiring the focus and thus visibility may not be secured.

Technical Solution

An aspect of the present disclosure provides an electronic device including a display and a processor operationally connected with the display to control the display, wherein the processor displays, on a main region, an execution screen corresponding to a first application among a plurality of applications, displays a second execution screen corresponding to a second application, on a first sub-region among a plurality of sub-regions displaying execution screens corresponding to a plurality of applications other than the first application, and increases a size of the first sub-region based on an input to the second application to display the increased first sub-region as an expanded first sub-region, the expanded first sub-region is overlapped with at least a portion of the main region and/or at least a portion of a second sub-region which is a sub-region other than the first sub-region, and the expanded first sub-region is visually displayed as an upper layer than the main region and the second sub-region.

Another aspect of the present disclosure provides an electronic device including a display outputting a plurality of execution screens corresponding to a plurality of applications on a plurality of display regions formed by dividing the display into different sizes and a processor operationally connected with the display to control the display, wherein the processor brings, into focus, a first sub-region that is a sub-region displaying a second application other than a first application among the plurality of applications, based on an input to the second application, and increases a size of the first sub-region based on an input to the second application to display the increased first sub-region as an expanded first sub-region, and the in-focus first sub-region is a region in a pointed state based on the input to the second application.

Yet another aspect of the present disclosure provides a method of driving an electronic device, the method including displaying a first execution screen corresponding to a first application among a plurality of applications, on a main region of a display, displaying a second execution screen corresponding to a second application among the plurality of applications, on a first sub-region among a plurality of sub-regions displaying execution screens corresponding to a plurality of applications other than the first application, and increasing a size of the first sub-region based on an input to the second application to display an expanded first sub-region. The expanded first sub-region is overlapped with at least a portion of the main region and/or at least a portion of a second sub-region which is a sub-region other than the first sub-region, and the expanded first sub-region is visually displayed as an upper layer than the main region and the second sub-region.

Advantageous Effects

According to embodiments disclosed in the present disclosure, by increasing the size of an in-focus region among a plurality of regions, it is possible to clearly distinguish the region from the remaining regions.

According to embodiments of the present disclosure, by increasing the area of the in-focus region among a plurality of regions, it is possible to improve visibility and for a user to more easily manipulate the in-focus region.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
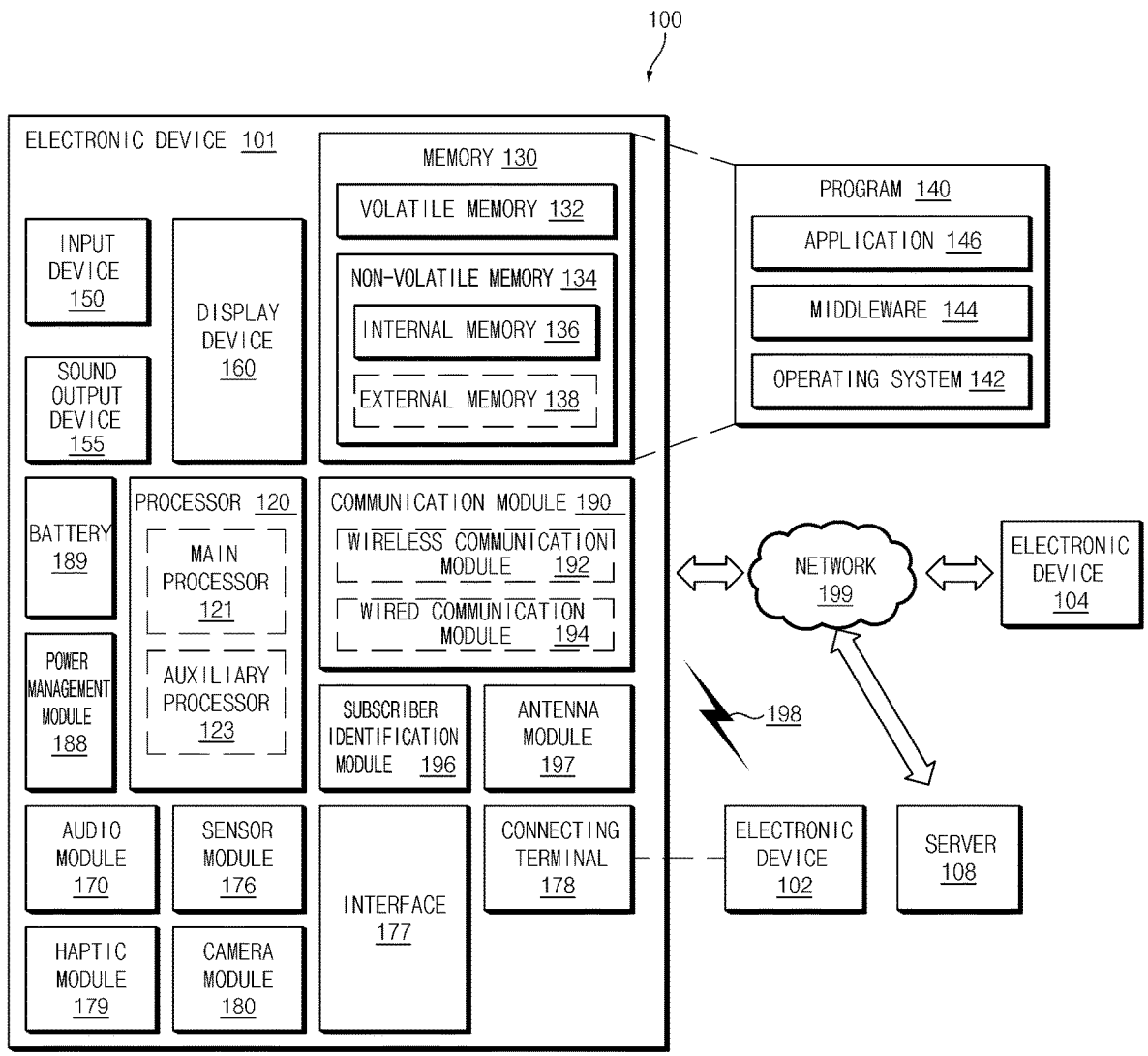
FIG. 1 is a block diagram illustrating an electronic device in a network environment according to various embodiments.

FIG. 1 as a block diagram illustrating an electronic device 101 in a network environment 100 according to various embodiments. Referring to FIG. 1, the electronic device 101 network environment 100 may communicate with an electronic device 102 via a first network 198 (e.g., a short-range wireless communication network), or an electronic device 104 or a server 100 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 100) of the components may be omitted from the electronic device 101, or one or more other components may be added in the electronic device 101. In some embodiments, some of the components may be implemented as single integrated circuitry. For example, the sensor module 176 (e.g., a fingerprint sensor, are iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 278 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 100 may include one or more lenses, image sensors, image signal processors, or flashes.

The power management module 188 may manage power supplied to the electronic device 101. According to one embodiment, the power management module 183 may be implemented as at least part of, for example, a power management integrated circuit (PMIC).

The battery 109 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each at the electronic devices 102 and 104 may be a device of a same type as, or a different from the electronic device 101. According to an embodiment, all or some of operation to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
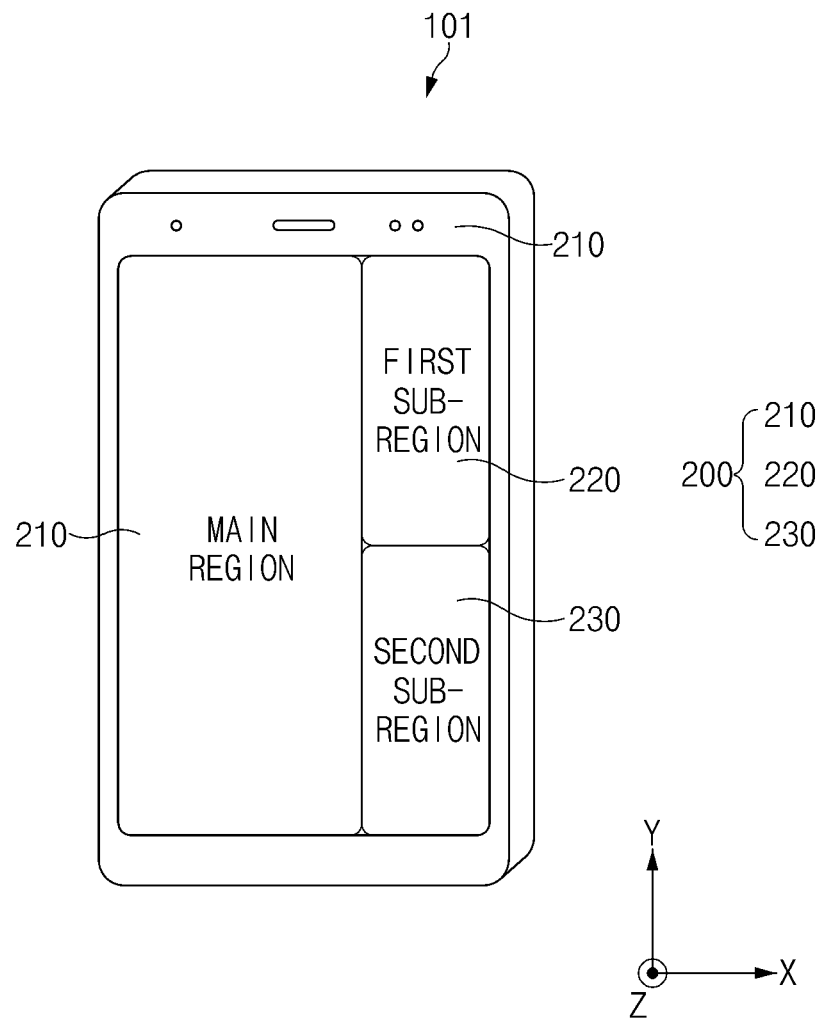
FIG. 2 is a diagram illustrating an electronic device according to an embodiment.

FIG. 2 is a diagram illustrating an electronic device 101 according to an embodiment. The electronic device 101 may include a display 200 and a housing 300.

In an embodiment, the display 200 may be disposed on the front surface of the electronic device 101. The display 200 may be disposed to be at least partially surrounded by the housing 300. The display 200 may be disposed on an inner space formed by the housing 300. For example, the display 200 may be disposed so that the side surfaces and the back surface of the display 200 are surrounded by the housing 300.

In an embodiment, the display 200 may output an execution screen of an application. The entire region of the display 200 may be divided into a plurality of display regions 210, 220, and 230. The display 200 may output execution screens of different applications by using each of the plurality of display regions 210, 220, and 230. For example, the display 200 may output the execution screen of a first application on a main region 210, the execution screen of a second application on a first sub-region 220, and the execution screen of a third application on a second sub-region 230. In an embodiment, the electronic device 101 may output the plurality of execution screens corresponding to the plurality of applications on the plurality of display regions 210, 220, and 230, at least partially having different sizes or having the same size.

In an embodiment, as described in FIG. 2, the display 200 may include the main region 210, the first sub-region 220, and the second sub-region 230. However, the embodiment of the present disclosure is not limited thereto, and FIG. 2 may be an example (exemplary size, exemplary shape, or exemplary arrangement) of displaying a plurality of execution screens on the display 200. The display 200 may display a process of executing an application or an operation result of the application only on some of the plurality of sub-regions 220 and 230, and may display icons representing applications that are not being executed or may not display an execution screen in the remaining regions of the plurality of sub-regions 220 and 230.

In an embodiment, the main region 210 may be any one display region that displays an execution screen of a main application, among the plurality of display regions 210, 220, and 230. For example, the execution screen of the main application may be an execution screen corresponding to an application specified by a user. The user may specify an application to be displayed on the main region 210 as the first application by using an input (e.g., touch input or voice input). In this case, the main region 210 may be a region displaying the execution screen corresponding to the execution process or operation result of the first application. As another example, the execution screen of the main application may be an execution screen corresponding to an application specified by the processor (e.g., the processor 120 of FIG. 1) of the electronic device 101. The processor may set the first application in advance. In this case, if there is no separate user input on the main region 210, an execution screen corresponding to the execution process or operation result of the first application may be displayed.

In an embodiment, the plurality of sub-regions 220 and 230 may be display regions other than the main region 210. The plurality of sub-regions 220 and 230 may be display regions displaying execution screens corresponding to a plurality of applications other than the first application. The plurality of sub-regions 220 and 230 may include the first sub-region 220 and the second sub-region 230, which may be an exemplary form in which execution screens of applications are displayed on the display 200. That is, the display 200 may variously adjust the number and shape of the sub-regions in the plurality of sub-regions 220 and 230.

In an embodiment, the main region 210 may be a region displaying an execution screen corresponding to an application having a high priority in the process of executing multiple applications. The first sub-region 220 and the second sub-region 230 may be a region displaying an execution screen corresponding to an application having a low priority in the process of executing multiple applications.

In an embodiment, each of the main region 210, the first sub-region 220, and the second sub-region 230 may be defined as a region set to display an execution screen corresponding to one application. The main region 210, the first sub-region 220, and the second sub-region 230 may independently display execution screens corresponding to different applications.

In an embodiment, the housing 300 may be disposed on the outer and edge regions of the electronic device 101. The housing 300 may protect other components disposed inside the electronic device 101. The housing 300 may define an edge shape and a binding shape of the electronic device 101. For example, the housing 300 may include a front plate and a back plate integrally formed with a back surface portion, which has a shape of facing away from the front plate and is opposite to the front plate, and side surface portions, which surround the space between the front plate and the back plate. As another example, the housing 300 may include a first plate facing a first direction, a second plate facing a second direction opposite to the first direction, and a first plate and a third plate facing a third direction perpendicular to the first direction and surrounding a part of the space between the first plate and the second plate.

In an embodiment, at least a portion of the housing 300 may be formed of a metal material or a non-metal material having a rigidity of a size set to support the display 200. The housing 300 may provide the surface thereof with voice input/output of the electronic device 101, a flash, and a camera. For example, an audio output unit (e.g., a speaker), a flash, and a camera may be disposed on one side of the electronic device 101, and an audio input unit (e.g., a microphone) may be disposed on the other side of the electronic device 101. In addition, the housing 300 may include an antenna. For example, an antenna may be formed on at least a portion of an edge region of the housing 300.

In an embodiment, the electronic device 101 may include a processor. The processor may be operationally connected to the display 200. The processor may control the display 200. For example, the processor may supply image data for displaying an execution screen of an application on the display 200 and various control signals.

Figure 3:
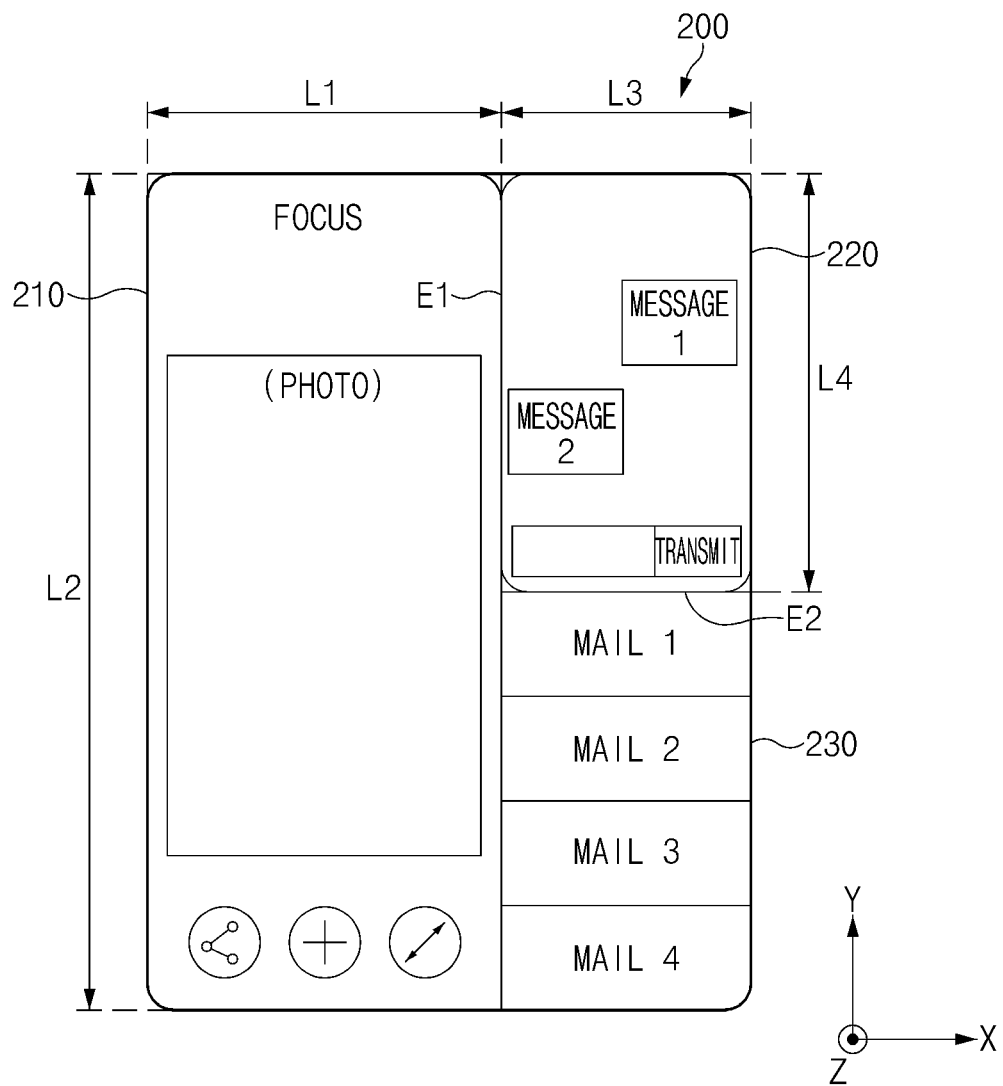
FIG. 3 is a diagram illustrating a case in which a main region has been brought into focus in a display according to an embodiment.

FIG. 3 is a diagram illustrating a case in which the main region 210 is in focus in the display 200 according to an embodiment.

In an embodiment, focus may mean a state in which a corresponding display region is pointed based on an input to an application. The focus may be a state in which an application to be activated is specified based on a user input or an input for operating the application, and a display region corresponding to the specified application is selected. For example, if an event for executing the first application is triggered based on a user input (e.g., touch input or voice input), the main region 210 displaying the first application may be brought into focus. For another example, if the first application is executed or an action event is triggered according to a specified condition (e.g., an alarm goes off or a notification is issued by a scheduler at a specified time) or receipt of information (e.g., a message or a transmitted picture is received), the main region 210 displaying the first application may be brought into focus.

In an embodiment, the display 200 may display execution screens corresponding to different applications on each of the main region 210, the first sub-region 220, and the second sub-region 230. For example, the display 200 may display an execution screen of a photo application on the main region 210, display an execution screen of a message application on the first sub-region 220, and display an execution screen of an e-mail application on the second sub-region 230.

In an embodiment, a processor (e.g., the processor 120 of FIG. 1) may set an execution screen corresponding to any one of a plurality of applications as the main execution screen. The processor may be configured to display the main execution screen on the main region 210. For example, the processor may be configured to set the execution screen of the photo application as the main execution screen and display the set execution screen on the main region 210.

In an embodiment, the in-focus region may be defined as a region selected among the main region 210, the first sub-region 220, or the second sub-region 230 based on the input of the user or the information input to the application. As illustrated in FIG. 3, if the main region 210 is selected, the main region 210 may be brought into focus. For example, if the user performs a touch input to the main region 210 or performs a voice input indicating a photo application corresponding to the main region 210, the processor may determine that the user has commanded that the main region 210 be brought into focus, and may bring the main region 210 into focus. For another example, if the processor executes a command for editing, transmitting, or sharing a photo, the processor may determine that an event for the photo application has been triggered, and may bring, into focus, the main region 210 displaying the execution screen corresponding to the photo application.

In an embodiment, the plurality of sub-regions 220 and 230 may be disposed adjacent to a first edge E1 formed in the first direction (e.g., Y-axis direction) among the edges of the main region 210. The main region 210 may be disposed on one side of the display 200. For example, as illustrated in FIG. 3, the main region 210 may be disposed in a left region of the display 200 in which upper and lower edges are disposed in the first direction. The plurality of sub-regions 220 and 230 may be disposed in the remaining region other than the region occupied by the main region 210. For example, as illustrated in FIG. 3, the plurality of sub-regions 220 and 230 may be disposed in a right region of the display 200 in which upper and lower edges are disposed in the first direction.

In an embodiment, the first sub-region 220 and the second sub-region 230 may be divided by a second edge E2 formed in a second direction (e.g., the X-axis direction) perpendicular to the first direction. The first sub-region 220 and the second sub-region 230 may be formed by dividing the interior of the plurality of sub-regions 220 and 230. For example, as illustrated in FIG. 3, the first sub-region 220 and the second sub-region 230 may be disposed vertically in the right region of the display 200 in which upper and lower edges are disposed in the first direction.

In an embodiment, the main region 210 may have a first length L1 in the X-axis direction. The main region 210 may have a second length L2 in the Y-axis direction.

In an embodiment, the first sub-region 220 may have a third length L3 in the X-axis direction. The third length L3 may be shorter than the first length L1. The first sub-region 220 may have a fourth length L4 in the Y-axis direction. The fourth length L4 may be shorter than the second length L2. The size of the first sub-region 220 may be smaller than the size of the main region 210.

In an embodiment, the size of the first sub-region 220 and the size of the second sub-region 230 may be controlled with the focus. For example, as illustrated in FIG. 3, if the first sub-region 220 and the second sub-region 230 are both out of focus, the size of the first sub-region 220 and the size of the second sub-region 230 may be set to be the same.

Figure 4:
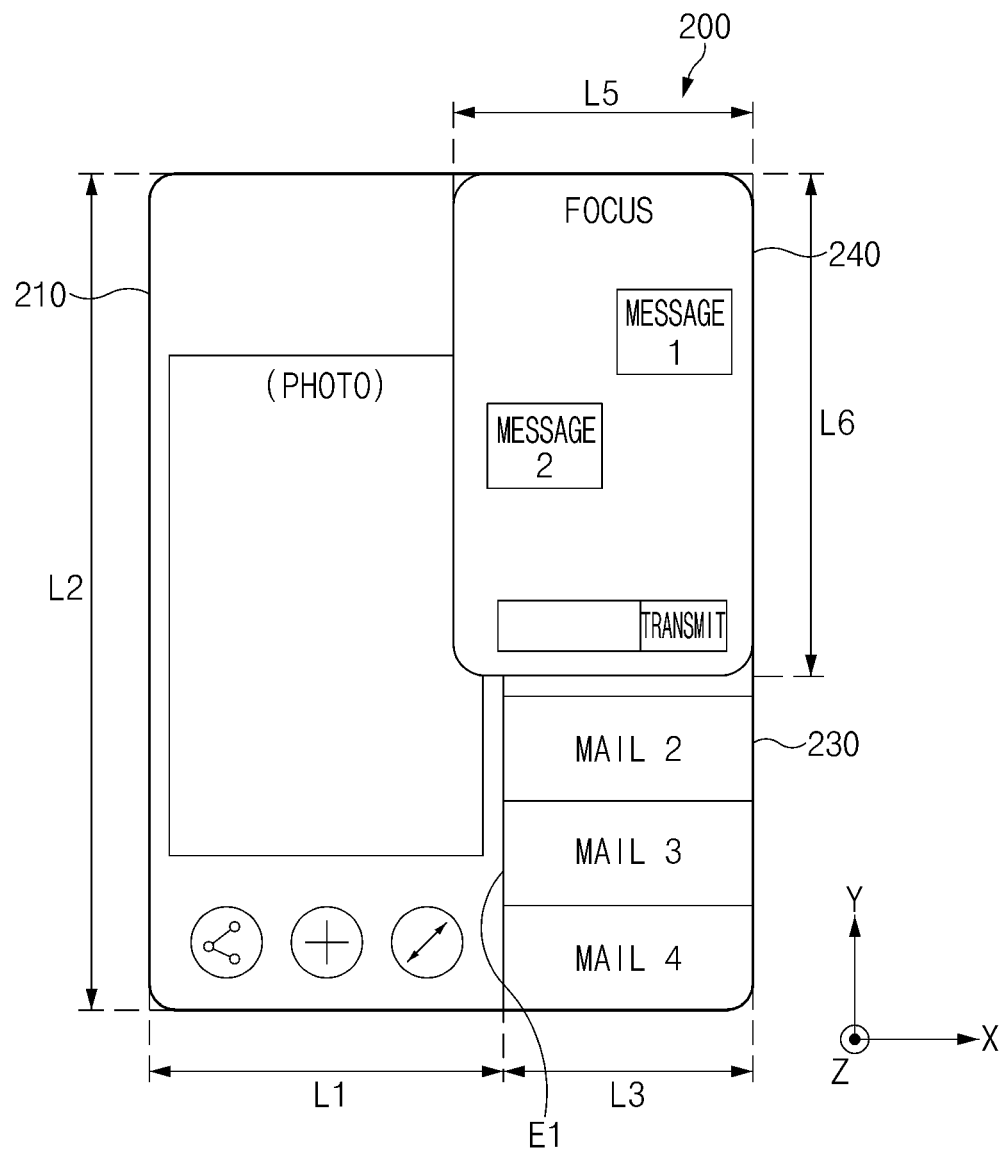
FIG. 4 is a diagram illustrating a case of displaying an expanded first sub-region in the display according to an embodiment.

FIG. 4 is a diagram illustrating a case of displaying an expanded first sub-region 240 in the display 200 according to an embodiment.

In an embodiment, the expanded first sub-region 240 may be a sub-region displaying the execution screen on which an application that has been brought into focus by the user is executed. For example, if the user inputs a message, a processor (e.g., the processor 120 of FIG. 1) may determine that the user has commanded that the message application be brought into focus, and may display the execution screen displaying the message application on the expanded first sub-region 240.

In an embodiment, the expanded first sub-region 240 may be a sub-region displaying the execution screen on which the application that has been brought into focus by the processor is executed. For example, if a message is received, the processor may set the message application to be brought into focus, and may display the execution screen displaying the message application on the expanded first sub-region 240.

In an embodiment, if the first sub-region 220 has been brought into focus, the processor may be configured to increase the size of the first sub-region 220 to be larger than the size of the second sub-region 230 to display the increased first sub-region as the expanded first sub-region 240. The electronic device 101 may increase the size of the in-focus first sub-region 220 and the size of objects included in the execution screen inside the first sub-region to display the increased first sub-region as the expanded first sub-region 240 on the display 200.

In an embodiment, the processor may be configured to display the in-focus first sub-region 220 as the expanded first sub-region 240. For example, if the user performs a touch input on the first sub-region 220 or a voice input for executing a message application, the processor may determine that the message application displayed in the first sub-region 220 has been brought into focus, and may increase the size of the first sub-region 220 to display the increased first sub-region as the expanded first sub-region 240. For another example, if the processor executes a command for creating, transmitting, or receiving a message, the processor may determine that the first sub-region 220 displaying the execution screen corresponding to the message application has the highest priority and may increase the size of the first sub-region 220 to display the increased first sub-region as the expanded first sub-region 240.

In an embodiment, the size of the expanded first sub-region 240 may be larger than the size of the second sub-region 230. In addition, the size of the expanded first sub-region 240 may be smaller than the size of the main region 210. For example, the fifth length L5 that is the length of the expanded first sub-region 240 in the X-axis direction may be longer than the third length L3 that is the length of the second sub-region 230 in the X-axis direction, and may be shorter than the first length L1 that is the length of the main region 210 in the X-axis direction. For another example, the sixth length L6 that is the length of the expanded first sub-region 240 in the Y-axis direction may be longer than the fourth length L4 that is the length of the second sub-region 230 in the Y-axis direction, and may be shorter than the second length L2 that is the length of the main region 210 in the Y-axis direction.

Figure 5:
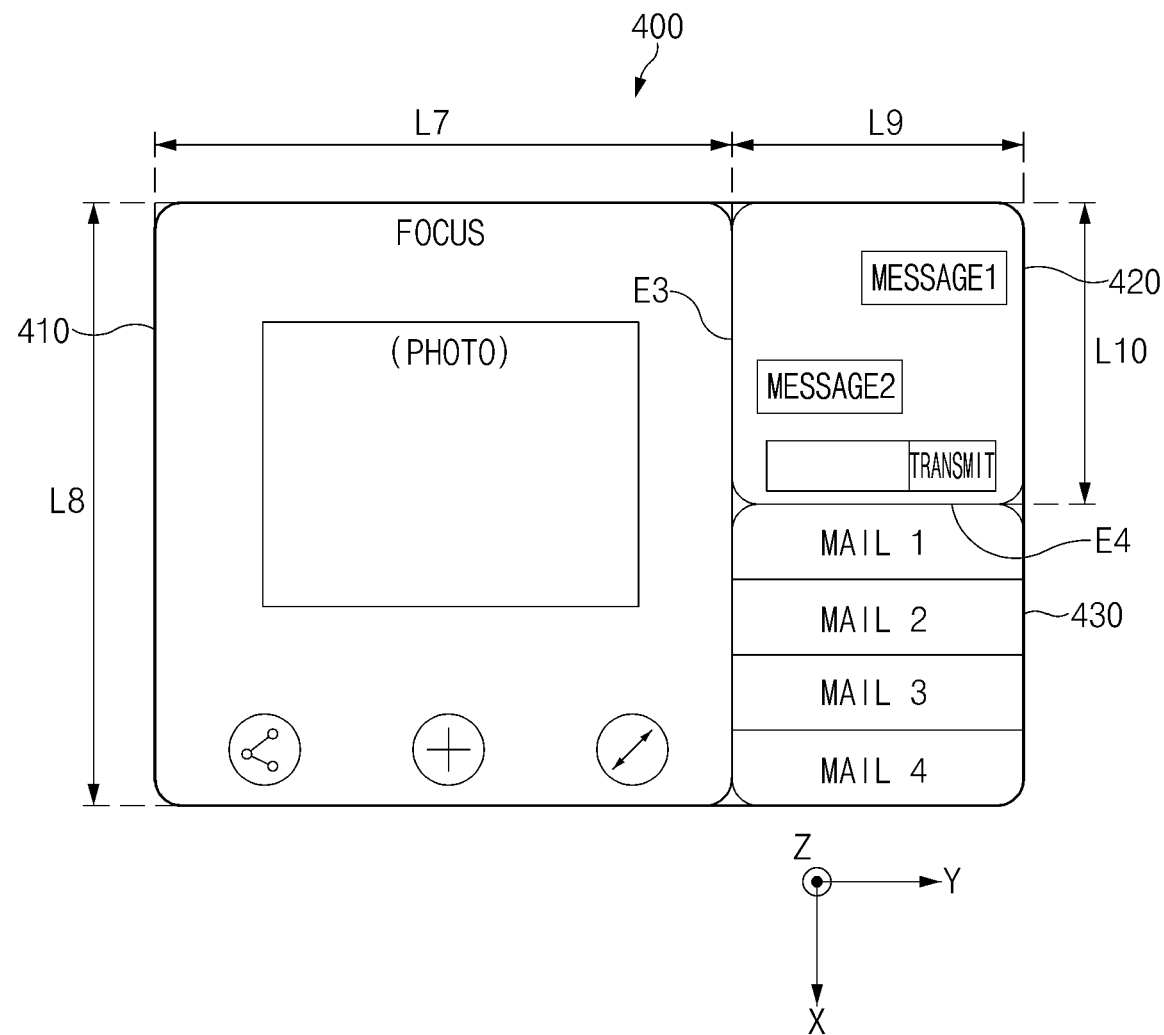
FIG. 5 is a diagram illustrating a case in which a main region has been brought into focus in a display according to another embodiment.

FIG. 5 is a diagram illustrating a case in which a main region 410 has been brought into focus in a display 400 according to another embodiment.

In an embodiment, the display 400 may display execution screens corresponding to different applications on each of the main region 410, a first sub-region 420, and a second sub-region 430. For example, the display 400 may display an execution screen corresponding to a photo application on the main region 410, display an execution screen corresponding to a message application on the first sub-region 420, and display an execution screen corresponding to an e-mail application on the second sub-region 430.

In an embodiment, a processor (e.g., the processor 120 of FIG. 1) may set an execution screen corresponding to any one of a plurality of applications as the main execution screen. The processor may be configured to display the main execution screen on the main region 410. For example, the processor may be configured to set the photo application as the main execution screen and display the set execution screen on the main region 410.

In an embodiment, the main region 410 may be brought into focus. For example, if the user performs a touch input on the main region 410, the processor may bring the main region 410 into focus. For another example, if the processor executes a command for editing, transmitting, or sharing a photo, the processor may bring, into focus, the main region 410 displaying the execution screen corresponding to the photo application.

In an embodiment, the plurality of sub-regions 420 and 430 may be disposed adjacent to a third edge E3 formed in the second direction (e.g., X-axis direction) among the edges of the main region 410. The main region 410 may be disposed on one side of the display 400. For example, as illustrated in FIG. 5, the main region 410 may be disposed in an upper region of the display 400 in which upper and lower edges are disposed in the first direction. The plurality of sub-regions 420 and 430 may be disposed in the remaining region other than the region occupied by the main region 410. For example, as illustrated in FIG. 5, the plurality of sub-regions 420 and 430 may be disposed in a lower region of the display 400 in which upper and lower edges are disposed in the first direction.

In an embodiment, the first sub-region 420 and the second sub-region 430 may be divided by a fourth edge E4 formed in the first direction (e.g., the Y-axis direction) perpendicular to the second direction. The first sub-region 420 and the second sub-region 430 may be formed by dividing the interior of the plurality of sub-regions 420 and 430. For example, as illustrated in FIG. 5, the first sub-region 420 and the second sub-region 430 may be separately disposed to the right and left in the lower region of the display 400 in which upper and lower edges are disposed in the first direction.

In an embodiment, the main region 410 may have a seventh length L7 in the Y-axis direction. The main region 410 may have an eighth length L8 in the X-axis direction.

In an embodiment, the first sub-region 420 may have a ninth length L9 in the Y-axis direction. The ninth length L9 may be shorter than the seventh length L7. The first sub-region 420 may have a tenth length L10 in the X-axis direction. The tenth length L10 may be shorter than the eighth length L8. The size of the first sub-region 420 may be smaller than the size of the main region 410.

In an embodiment, the size of the first sub-region 420 and the size of the second sub-region 430 may be controlled with the focus. For example, as illustrated in FIG. 5, if the first sub-region 420 and the second sub-region 430 are both out of focus, the size of the first sub-region 420 and the size of the second sub-region 430 may be set to be the same.

Figure 6:
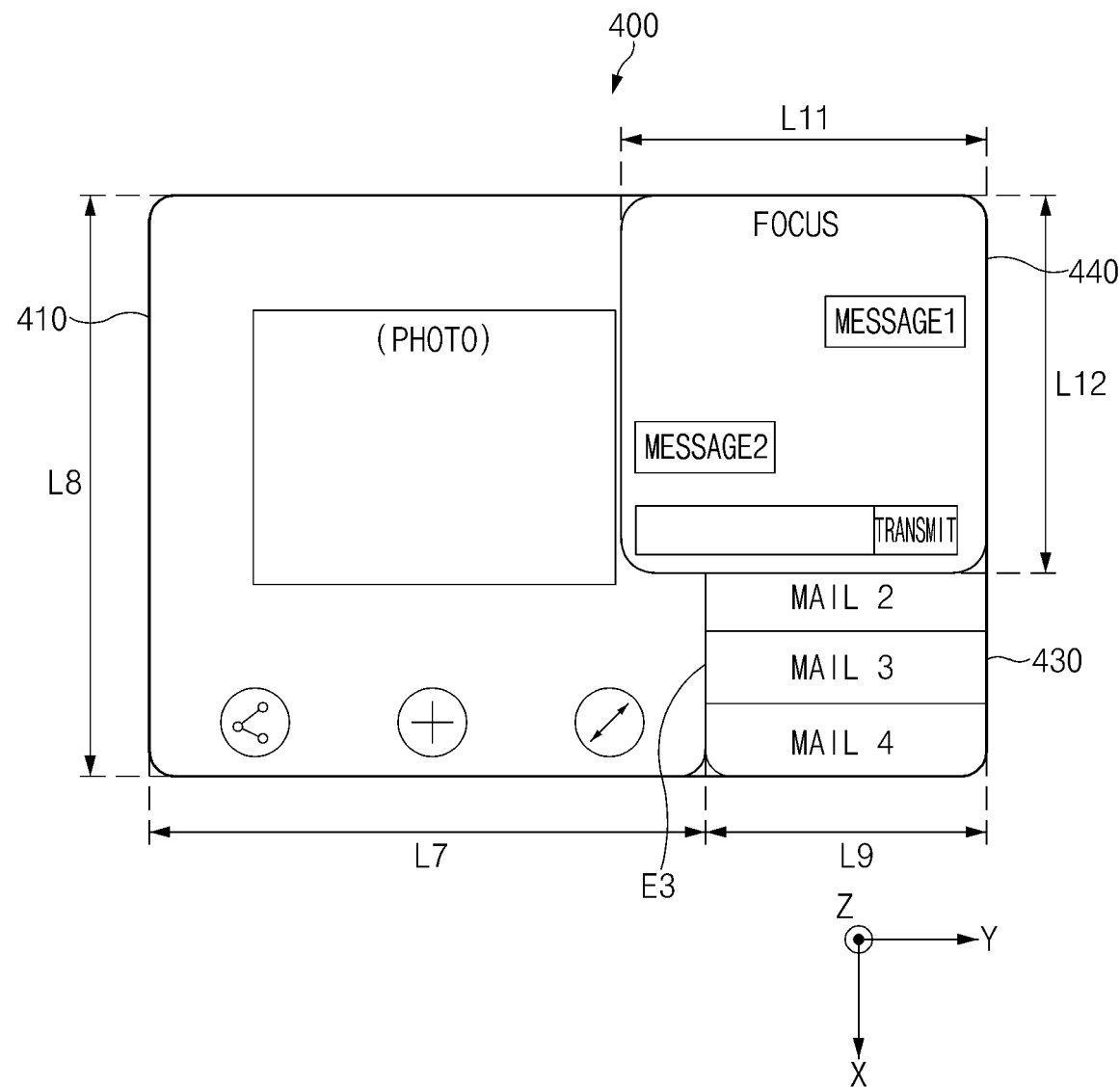
FIG. 6 is a diagram illustrating a case of displaying an expanded first sub-region in the display according to another embodiment.

FIG. 6 is a diagram illustrating a case of displaying an expanded first sub-region 440 in the display 400 according to an embodiment.

In an embodiment, the expanded first sub-region 440 may be a sub-region displaying the execution screen on which the application that has been activated by a processor (e.g., the processor 120 of FIG. 1) is executed. For example, if the user inputs a message, the processor may be configured to activate the message application displayed in the expanded first sub-region 440, and may display, on the expanded first sub-region 440, the execution screen for executing the message application to display a message input by the user.

In an embodiment, the size of the first sub-region 420 and the size of the second sub-region 430 may be controlled with the focus. As illustrated in FIG. 6, if the first sub-region 420 has been brought into focus, the size of the first sub-region 420 may be increased to be larger than the size of the second sub-region 430 to display the increased first sub-region as the expanded first sub-region 440.

In an embodiment, the expanded first sub-region 440 may be implemented if the first sub-region 420 has been brought into focus. For example, if the user performs a touch input on the first sub-region 420 or a voice input for executing the message application displayed on the first sub-region 420, the processor may determine that the first sub-region 420 has been brought into focus, and may increase the size of the first sub-region 420 to display the increased first sub-region as the expanded first sub-region 440. For another example, if the processor executes a command for creating, transmitting, or receiving a message, the processor may determine that the message application has been selected. Accordingly, the processor may increase the size of the first sub-region 420 by bringing, into focus, the first sub-region 420 displaying the execution screen corresponding to the message application to display the increased first sub-region as the expanded first sub-region 440.

In an embodiment, the size of the expanded first sub-region 440 may be larger than the size of the second sub-region 430. The size of the expanded first sub-region 440 may be smaller than the size of the main region 410. For example, an eleventh length L11 that is the length of the expanded first sub-region 440 in the Y-axis direction may be longer than the ninth length L9 that is the length of the second sub-region 430 in the Y-axis direction, and may be shorter than the seventh length L7 that is the length of the main region 410 in the Y-axis direction. For another example, a twelfth length L12 that is the length of the expanded first sub-region 440 in the X-axis direction may be longer than the tenth length L10 that is the length of the second sub-region 430 in the X-axis direction, and may be shorter than the eighth length L8 that is the length of the main region 410 in the X-axis direction.

Figure 7:
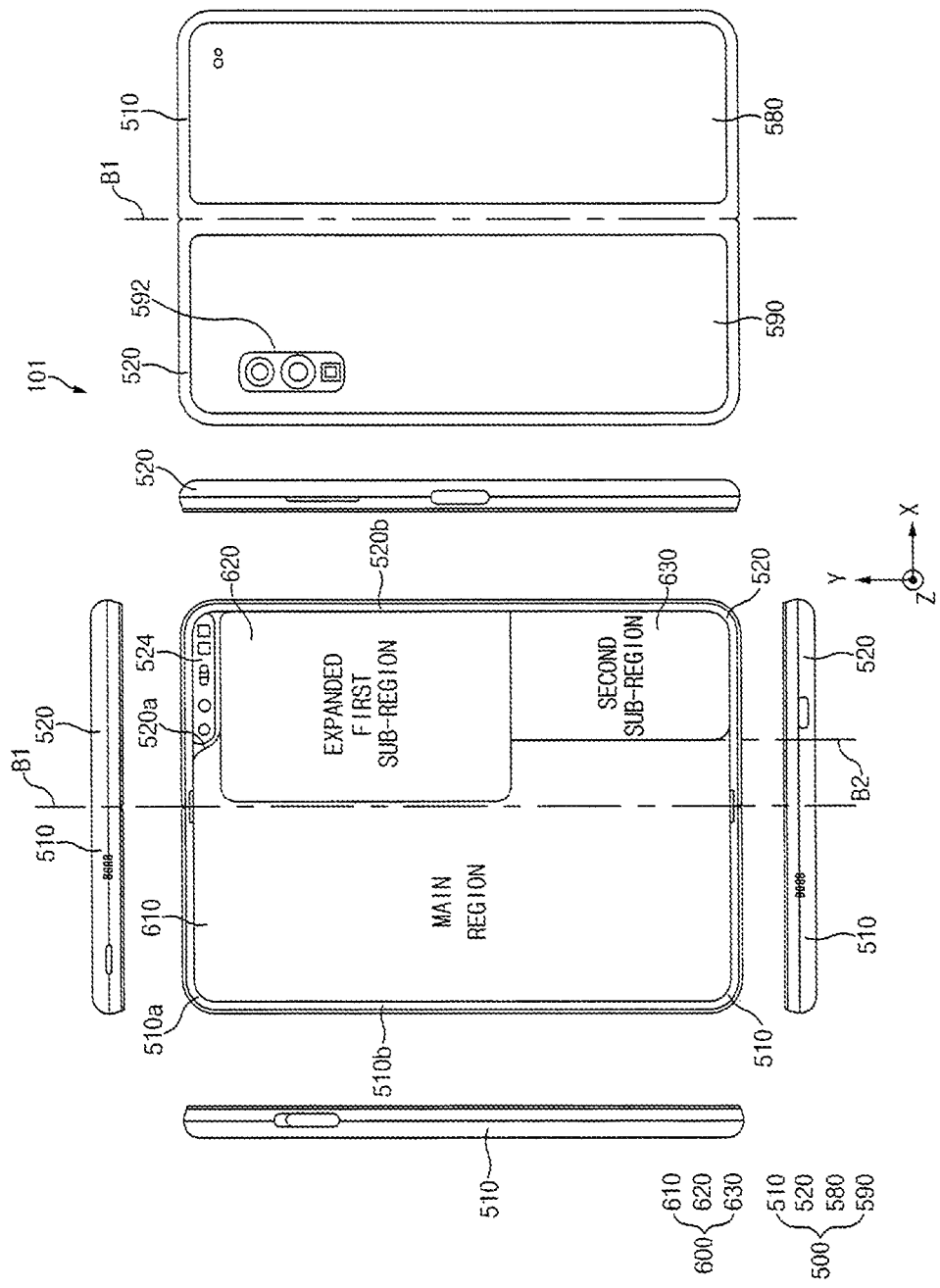
FIG. 7 is a diagram illustrating a case in which an electronic device according to another embodiment is outstretched.
Figure 8:
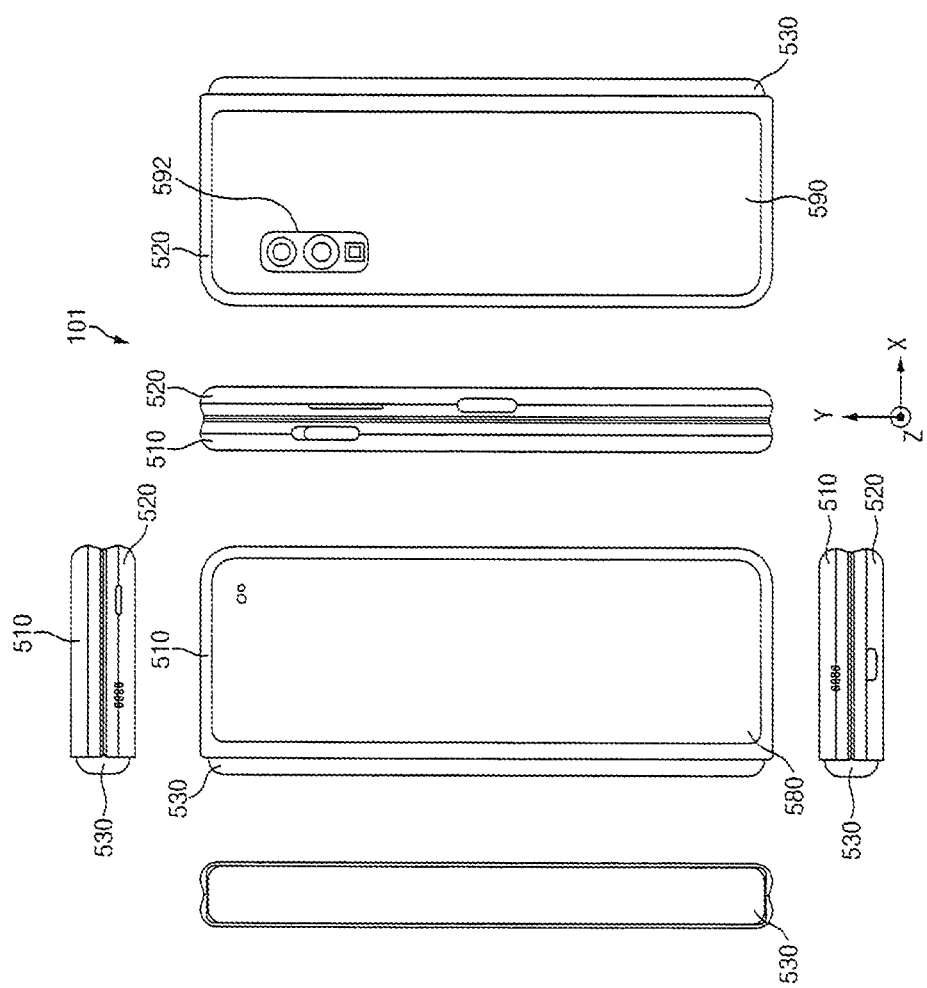
FIG. 8 is a diagram illustrating a case in which the electronic device according to another embodiment is folded.

FIG. 7 is a diagram illustrating a case in which an electronic device 101 according to another embodiment is outstretched. FIG. 8 is a diagram illustrating a case in which the electronic device 101 according to another embodiment is folded.

In an embodiment, the electronic device 101 may have a foldable characteristic. The electronic device 101 having the foldable characteristic may have an outstretched state illustrated in FIG. 7, a folded state illustrated in FIG. 8, and an intermediate state that is a state between the outstretched state and the folded state.

In an embodiment, the electronic device 101 may include a housing 500, a cover 530 covering a foldable portion of the housing 500, and a display 600 disposed in a space formed by the housing 500.

In an embodiment, the housing 500 may include a first structure 510 including a first bezel 510a and a second bezel 510b, a second structure 520 including a third bezel 520a, a fourth bezel 520b, and a notch section 524, a first back cover 580, and a second back cover 590. However, the present disclosure is not limited thereto, and may be implemented by combination and/or coupling of other shapes or parts. For example, in another embodiment, the first structure 510 and the first back cover 580 may be integrally formed, and the second structure 520 and the second back cover 590 may be integrally formed.

In an embodiment, the first structure 510 and the second structure 520 may be disposed on both sides of a first boundary line B1. The first structure 510 and the second structure 520 may be folded based on the first boundary line B1. The first boundary line B1 may be set to have a structure in which the first structure 510 and the second structure 520 are symmetrically folded. For example, the first boundary line B1 may pass through the center of the display 600.

In an embodiment, the display 600 may be disposed in a space formed by the housing 500. For example, the display 600 may be seated on a recess formed by the housing 500 to form most of the front surface of the electronic device 101. The display 600 may include a main region, an expanded first sub-region 620, and a second sub-region 630.

In an embodiment, the main region 610 may occupy more than half of the region of the display 600. Accordingly, the first boundary line B1 may cross the interior of the main region 610 of the display 600. The display 600 may be folded along the first boundary line B1 crossing the interior of the main region 610. Accordingly, the display 600 may at least partially fold the main region 610.

In an embodiment, the expanded first sub-region 620 may be formed to cross the second boundary line B2, which is a boundary line between the main region 610 and the second sub-region 630, thereby expanding toward the main region 610. The expanded first sub-region 620 may be expanded adjacent to the first boundary line B1. The expanded first sub-region 620 may be overlapped with at least a portion of the main region 610 and the second sub-region 630.

In an embodiment, an edge region of the display 600 may be surrounded by a bezel region. The bezel region may include the first bezel 510a, the second bezel 510b, the third bezel 520a, the fourth bezel 520b, and the notch section 524. The first to fourth bezels 510a, 510b, 520a, and 520b may support the display 600 to maintain the shape of the display 600.

In an embodiment, the notch section 524 may be formed to have a predetermined region adjacent to one corner of the second structure 520. However, the displacement, shape, and size of the notch section 524 are not limited to the illustrated example. For example, in another embodiment, the notch section 524 may be provided at another corner of the second structure 520 or in any region between the upper corner and the lower corner. The notch section 524 may be disposed adjacent to the expanded first sub-region 620. For example, the notch section 524 may be disposed adjacent to one edge of the expanded first sub-region 620.

In an embodiment, components embedded in the electronic device 101 to perform various functions may be exposed on the front surface of the electronic device 101 through the notch section 524 or through one or more openings provided in the notch section 524. Components may include various types of sensors. Sensors may include at least one of a front camera, a receiver, and a proximity sensor.

In an embodiment, the first back cover 580 may be disposed on at least a portion of the back surface of the electronic device 101. The first back cover 580 may have a substantially rectangular periphery. The periphery of the first back cover 580 may be wrapped by the first structure 510.

In an embodiment, the second back cover 590 may be disposed opposite the first back cover 580 with respect to the first boundary line B1 in the back surfaces of the electronic device 101. The periphery of the second back cover 590 may be wrapped by the second structure 520.

In an embodiment, the first back cover 580 and the second back cover 590 may have a substantially symmetrical shape with respect to the first boundary line B1. However, the first back cover 580 and the second back cover 590 do not necessarily have mutually symmetrical shapes, and the electronic device 101 may include the first back cover 580 and the second back cover 590 having various shapes.

In an embodiment, the first structure 510, the second structure 520, the first back cover 580, and the second back cover 590 may form a space in which various components of the electronic device 101 (e.g., a printed circuit board (PCB) or battery) may be disposed.

In an embodiment, the cover 530 may be disposed between the first structure 510 and the second structure 520. The cover 530 may be configured to cover the folded structure (e.g., a hinge structure) of the housing 500. The cover 530 may be covered by a part of the first structure 510 and the second structure 520 or exposed to the outside depending on the state of the electronic device 101 (outstretched or folded). For example, as illustrated in FIG. 7, if the electronic device 101 is in the outstretched state, the cover 530 may not be exposed by being covered by the first structure 510 and the second structure 520. For another example, if the electronic device 101 is in the folded state as illustrated in FIG. 8, the cover 530 may be exposed to the outside between the first structure 510 and the second structure 520.

Figure 9:
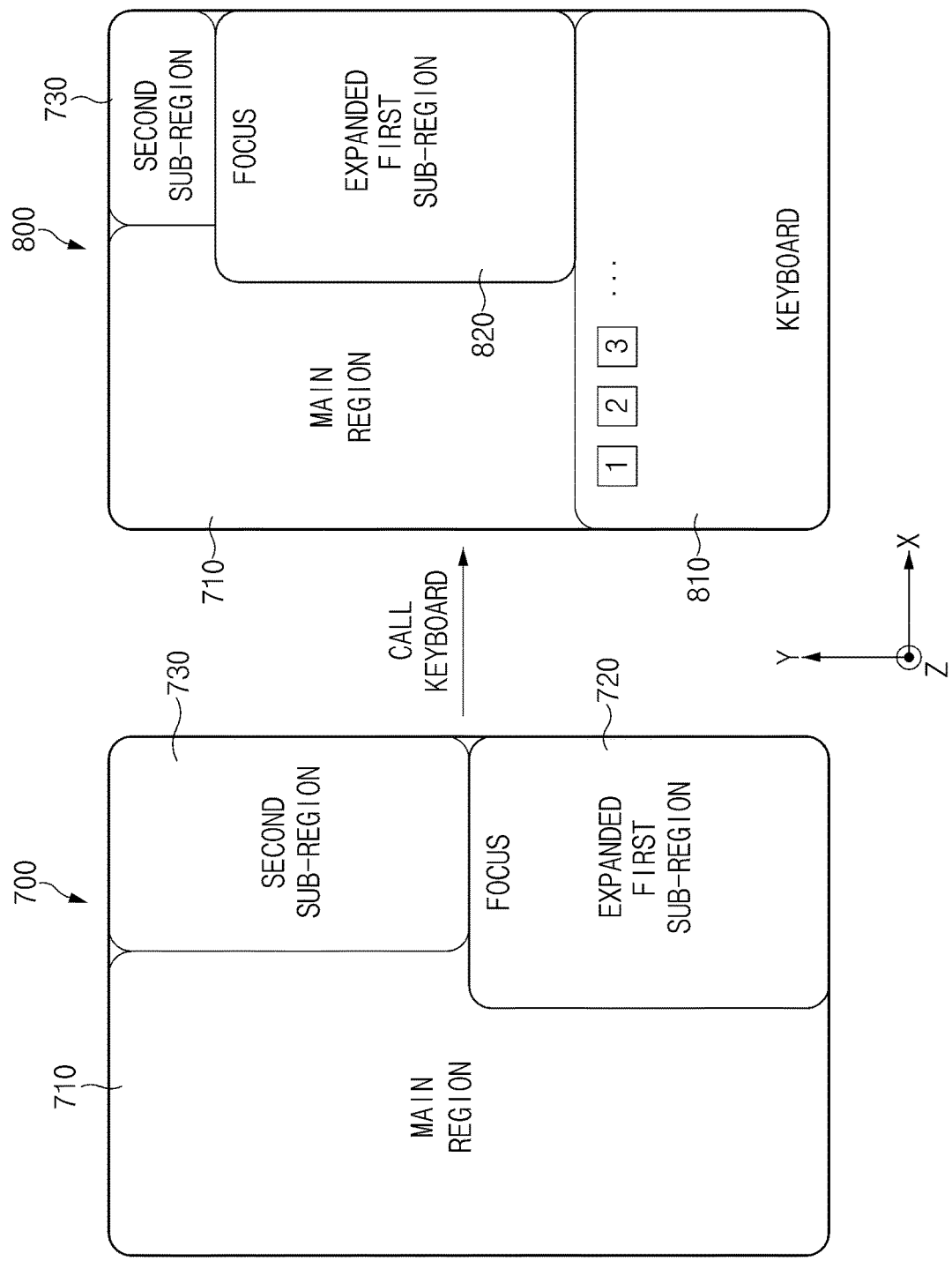
FIG. 9 is a diagram illustrating a case of calling a keyboard in a state in which an expanded first sub-region is present in a display according to yet another embodiment.

FIG. 9 is a diagram illustrating a case of calling a keyboard 810 in a state in which an expanded first sub-region 720 is present in a display 700 according to yet another embodiment.

In an embodiment, the display 700 may include a main region 710, an expanded first sub-region 720, and a second sub-region 730. The expanded first sub-region 720 may be an in-focus region. The expanded first sub-region 720 may be disposed at the lower portion of the display 700.

In an embodiment, a display 800 may display an input means. As illustrated in FIG. 9, the input means may be a keyboard 810 through which a user may input characters, numbers, or symbols by performing a touch on the surface of the display 800. However, the present disclosure is not limited thereto, and the input means may be a region in which a user may input a figure or a picture that may be drawn by dragging on the display 800.

In an embodiment, the electronic device 101 may call the keyboard 810 on the display 800 in response to a set input. For example, when the electronic device 101 detects a touch of the user, the electronic device 101 may call the keyboard 810 on the display 800. For another example, the electronic device 101 may call the keyboard 810 on the display 800 by pressing a button disposed on one side of the electronic device 101. For another example, if a text field input is required on an execution screen (e.g., an execution screen of the second application) displayed on the in-focus first sub-region 720 inside the display 800, the electronic device 101 may call the keyboard 810. The keyboard 810 may be disposed on at least a partial region of the display 800. For example, the keyboard 810 may be called from a lower edge of the display 800 and disposed on a lower region.

In an embodiment, the electronic device 101 may move the expanded first sub-region 820 such that the expanded first sub-region 820 is not overlapped with the input means on the display 800, if the input means is displayed on the display 800. For example, the electronic device 101 may move the expanded first sub-region 820 to the upper region on which the keyboard 810 is not disposed on the display 800, if the keyboard 810 is displayed on the lower region of the display 800. The expanded first sub-region 820 may be brought into focus and may have a higher priority than the second sub-region 830. The electronic device 101 may be configured such that the expanded first sub-region 820 covers at least a portion of the second sub-region 830 while moving onto the second sub-region 830.

Figure 10:
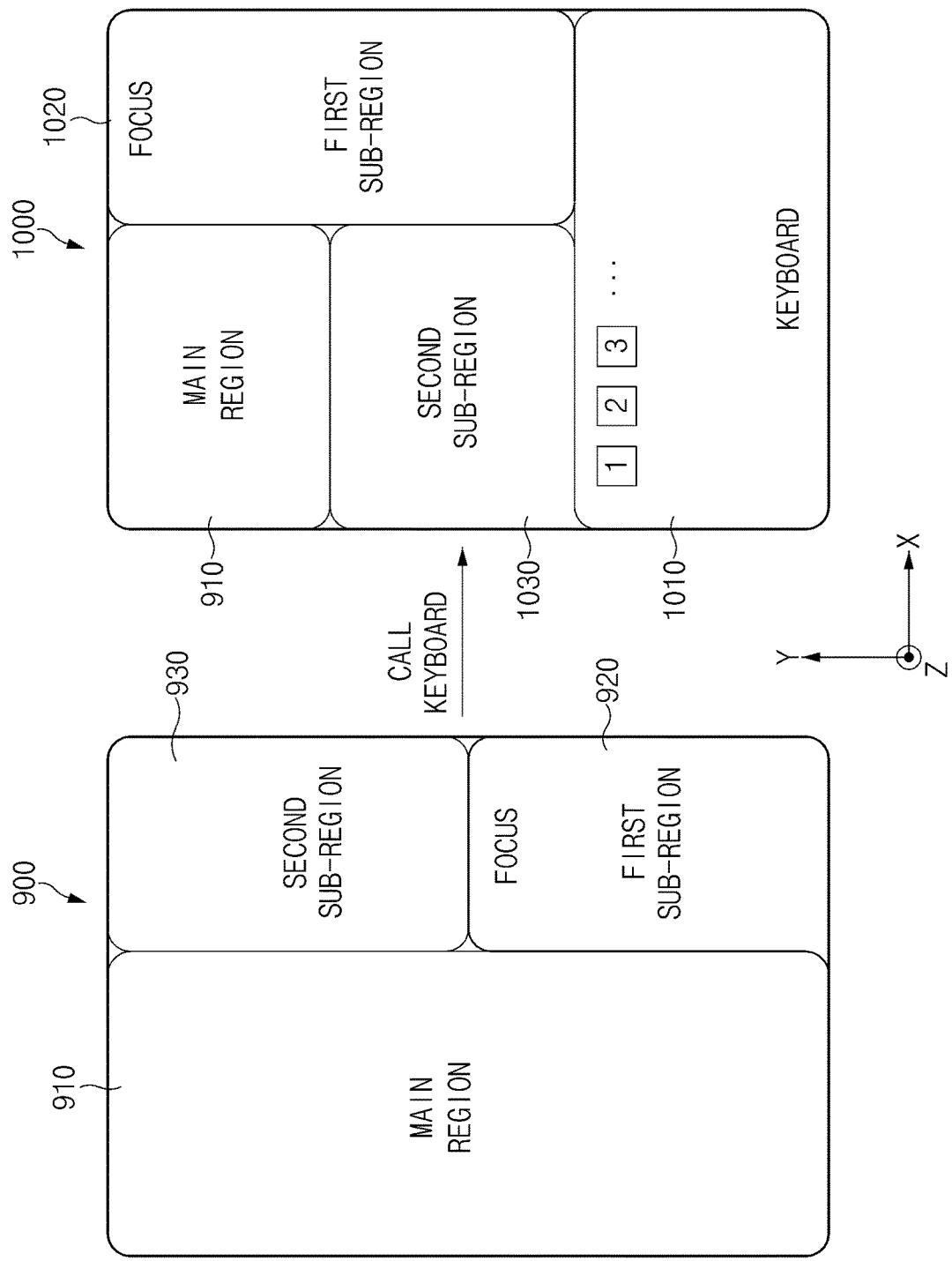
FIG. 10 is a diagram illustrating a case of calling a keyboard in a state in which a first sub-region is present in a display according to yet another embodiment.

FIG. 10 is a diagram illustrating a case of calling a keyboard 1010 in a state in which a first sub-region 920 is present in a display 900 according to yet another embodiment.

In an embodiment, the display 900 may include a main region 910, a first sub-region 920, and a second sub-region 930. The first sub-region 920 may be an in-focus region. The first sub-region 920 may be disposed at the lower portion of the display 900. FIG. 10 illustrates a case in which the in-focus first sub-region 920 has the same size as the second sub-region 930. In this case, the in-focus first sub-region 920 may have a color different from that of the second sub-region 930. Alternatively, a highlight display may appear on the in-focus first sub-region 920. However, the present disclosure is not limited thereto, and as described with reference to FIGS. 3 to 6, the size of the in-focus first sub-region 920 may be larger than the size of the second sub-region 930.

In an embodiment, a display 1000 may display an input means. As illustrated in FIG. 10, the input means may be a keyboard 1010 through which a user may input characters, numbers, or symbols by performing a touch on the surface of the display 1000. However, the present disclosure is not limited thereto, and the input means may be a region in which a user may input a figure or a picture that may be drawn by dragging on the display 1000.

In an embodiment, the electronic device 101 may call the keyboard 1010 on the display 1000 in response to a set input. For example, when the electronic device 101 detects a touch of the user, the electronic device 101 may call the keyboard 1010 on the display 1000. For another example, the electronic device 101 may call the keyboard 1010 on the display 1000 by pressing a button disposed on one side of the electronic device 101. For another example, if a text field input is required on an execution screen (e.g., execution screen of the second application) displayed on the in-focus first sub-region 920 inside the display 1000, the electronic device 101 may call the keyboard 1010. The keyboard 1010 may be disposed on at least a partial region of the display 1000. For example, the keyboard 1010 may be called from a lower edge of the display 1000 and disposed on a lower region.

In an embodiment, if the input means is displayed on the display 1000, the electronic device 101 may adjust a disposition relationship of at least some of the main region 910, a first sub-region 1020, and a second sub-region 1030 such that the main region 910, the first sub-region 1020, and the second sub-region 1030 are not overlapped with the input means. The electronic device 101 may change the size of at least some of the main region 910, the first sub-region 1020, and the second sub-region 1030. The electronic device 101 may change the positional relationship of at least some of the main region 910, the first sub-region 1020, and the second sub-region 1030.

In an embodiment, if the keyboard 1010 is displayed on the display 1000, the electronic device 101 may change the sizes and positions of the main region 910, the first sub-region 1020, and the second sub-region 1030 such that the main region 910, the first sub-region 1020, and the second sub-region 1030 are not overlapped with the keyboard 1010. For example, in FIG. 10, the main region 910 on the display 1000 may have a reduced size compared to the size before the keyboard 1010 is called. In addition, in FIG. 10, since the main region 910 is not brought into focus, the main region 910 may be at least partially covered by the second sub-region 1030. The second sub-region 1030 may move onto the main region 910 so as to be overlapped with the main region 910. However, the present disclosure is not limited thereto, and the main region 910 and the second sub-region 1030 may not be overlapped with each other. In this case, the main region 910 and the second sub-region 1030 may be rearranged on the display 1000 to ensure visibility. The first sub-region 1020 may be an in-focus region. The first sub-region 1020 may move to the upper portion of the display 1000 so as not to be overlapped with the keyboard 1010, the main region 910, and the second sub-region 1030.

Figure 11:
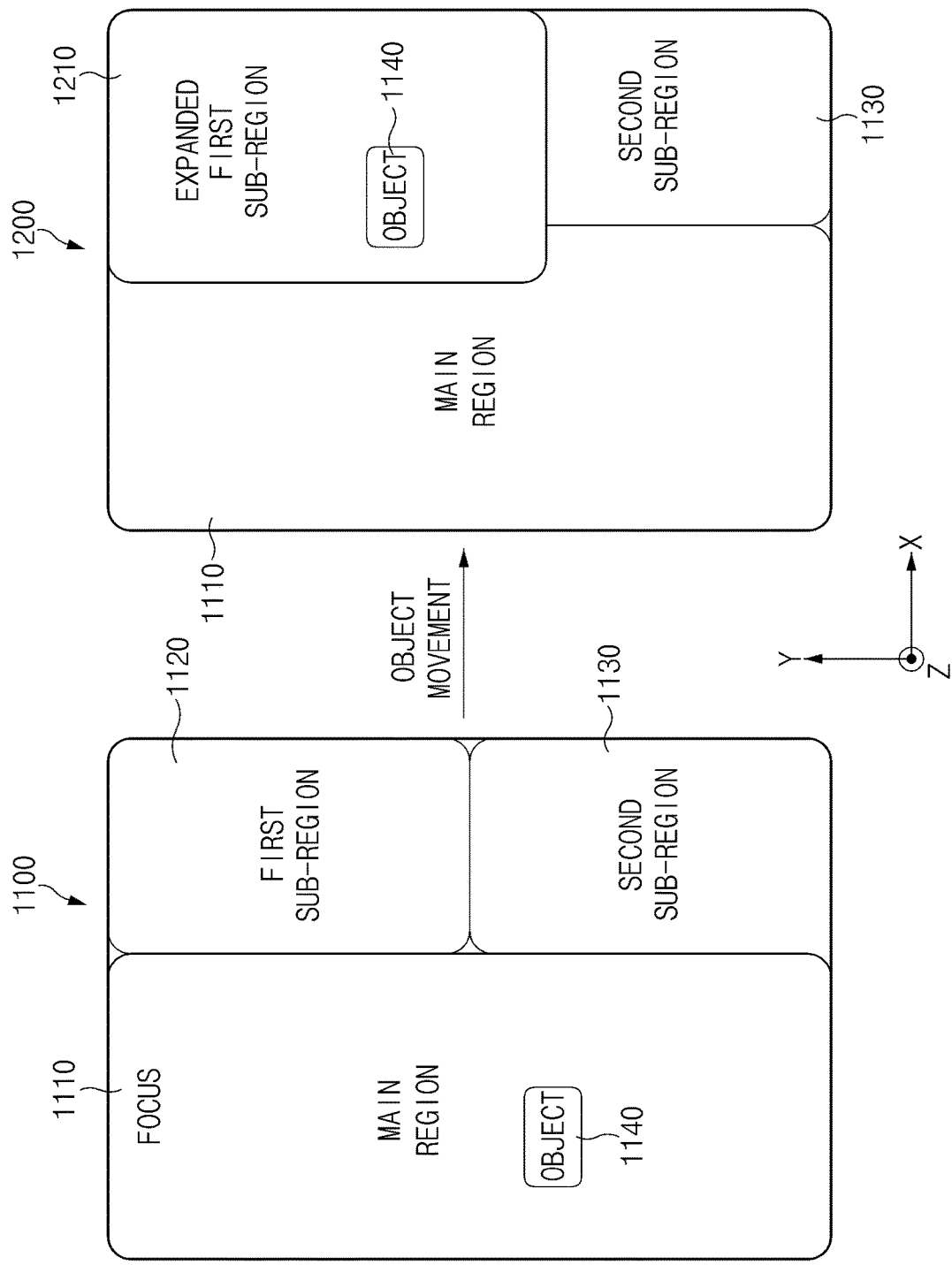
FIG. 11 is a diagram illustrating a process of displaying an expanded first sub-region by bringing a first sub-region into focus in a state in which a main region is in focus, in a display according to yet another embodiment.

FIG. 11 is a diagram illustrating a process of displaying an expanded first sub-region 1210 by bringing a first sub-region 1120 into focus in a state in which a main region 1110 is in focus, in a display 1100 according to yet another embodiment.

In an embodiment, the display 1100 may include a main region 1110, a first sub-region 1120, a second sub-region 1130 and an object 1140. The main region 1110 may be an in-focus region.

In an embodiment, the object 1140 may be disposed inside the main region 1110. The object 1140 may be a component of the execution screen displayed in the main region 1110. The object 1140 may be an icon for executing a function of an application that displays the execution screen of the main region 1110 or a command symbol indicating an operating state of the application. If the object 1140 is inside the main region 1110, the object 1140 may set the main region 1110 as an in-focus region.

In an embodiment, the object 1140 may move inside the display 1100. For example, the object 1140 may be moved into the first sub-region 1120 or the second sub-region 1130 by a touch input of the user (drag and drop, or the like) on the display 1100. For another example, the electronic device 101 may move the object 1140 from the interior of the main region 1110 to the interior of the first sub-region 1120 or the second sub-region 1130 by using a processor (e.g., the processor 120 in FIG. 1).

In an embodiment, the electronic device 101 may set the expanded first sub-region 1210 by moving the object 1140 disposed on the display 1100 to the first sub-region 1120. The processor of the electronic device 101 may determine that the first sub-region 1120 in which the object 1140 is disposed has been brought into focus. The processor of the electronic device 101 may increase the size of the first sub-region 1120 to display the increased first sub-region as the expanded first sub-region 1210.

Figure 12:
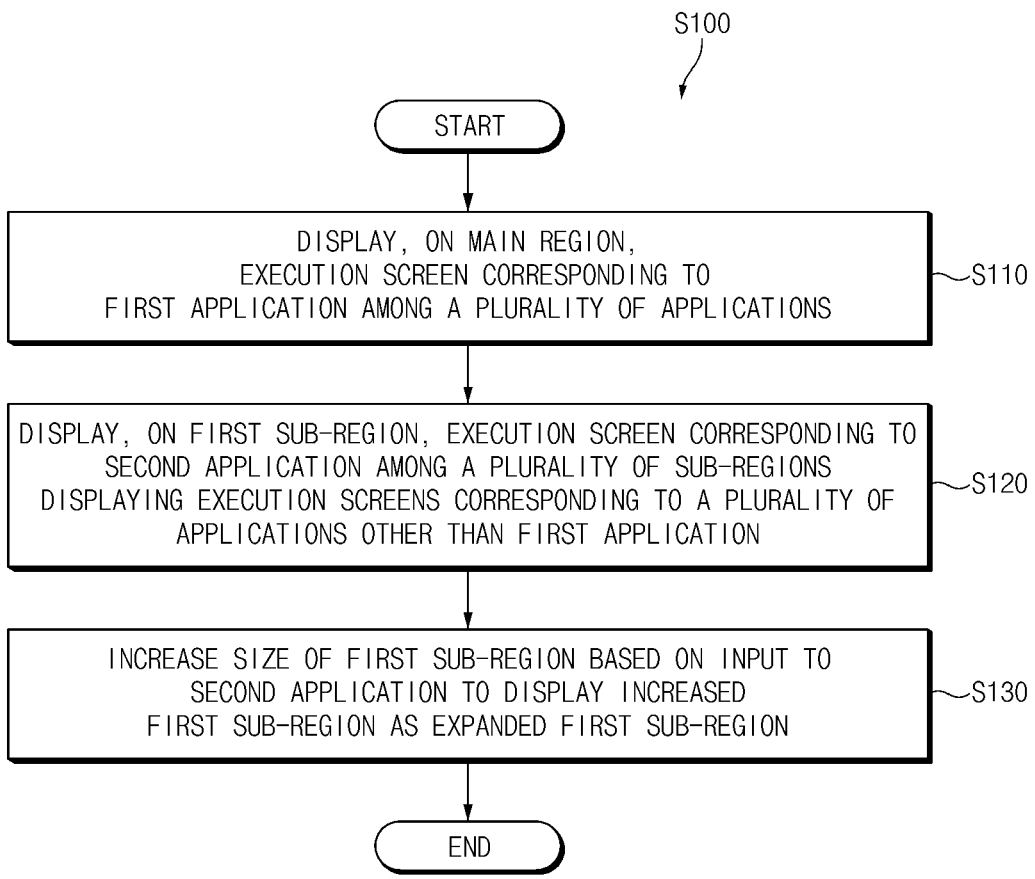
FIG. 12 is a flowchart illustrating a method of driving the electronic device according to an embodiment.

FIG. 12 is a flowchart S100 illustrating a method of driving the electronic device 101 according to an embodiment.

The electronic device 101 according to an embodiment may display the execution screen corresponding to a first application among a plurality of applications on a main region (e.g., the main region 210 of FIG. 2) of a display (e.g., the display 200 of FIG. 2), in operation S110. A processor of the electronic device 101 (e.g., the processor 120 of FIG. 1) may be configured to set the first application based on a user input or information preset in the processor. The processor may display an execution screen corresponding to an event occurring in the first application on the main region.

In operation S120, the electronic device 101 according to an embodiment may display, on a first sub-region (e.g., the first sub-region 220 of FIG. 2) of the display, an execution screen corresponding to a second application among a plurality of sub-regions (e.g., the plurality of sub-regions 220 and 230 of FIG. 2) displaying execution screens corresponding to a plurality of applications other than the first application. The processor of the electronic device 101 may be configured to set a second application based on a user input or information preset in the processor. The processor may display an execution screen corresponding to an event occurring in the second application on the first sub-region.

In operation S130, the electronic device 101 according to an embodiment may increase the size of the first sub-region based on an input to the second application to display the increased first sub-region as an expanded first sub-region (e.g., the expanded first sub-region 240 of FIG. 4). The processor of the electronic device 101 may bring the first sub-region into focus in response to the input of the user to the second application or an event for operating the second application. The processor may increase the size of the in-focus first sub-region and the size of objects included in the execution screen inside the first sub-region to display the increased first sub-region as the expanded first sub-region.

Figure 13:
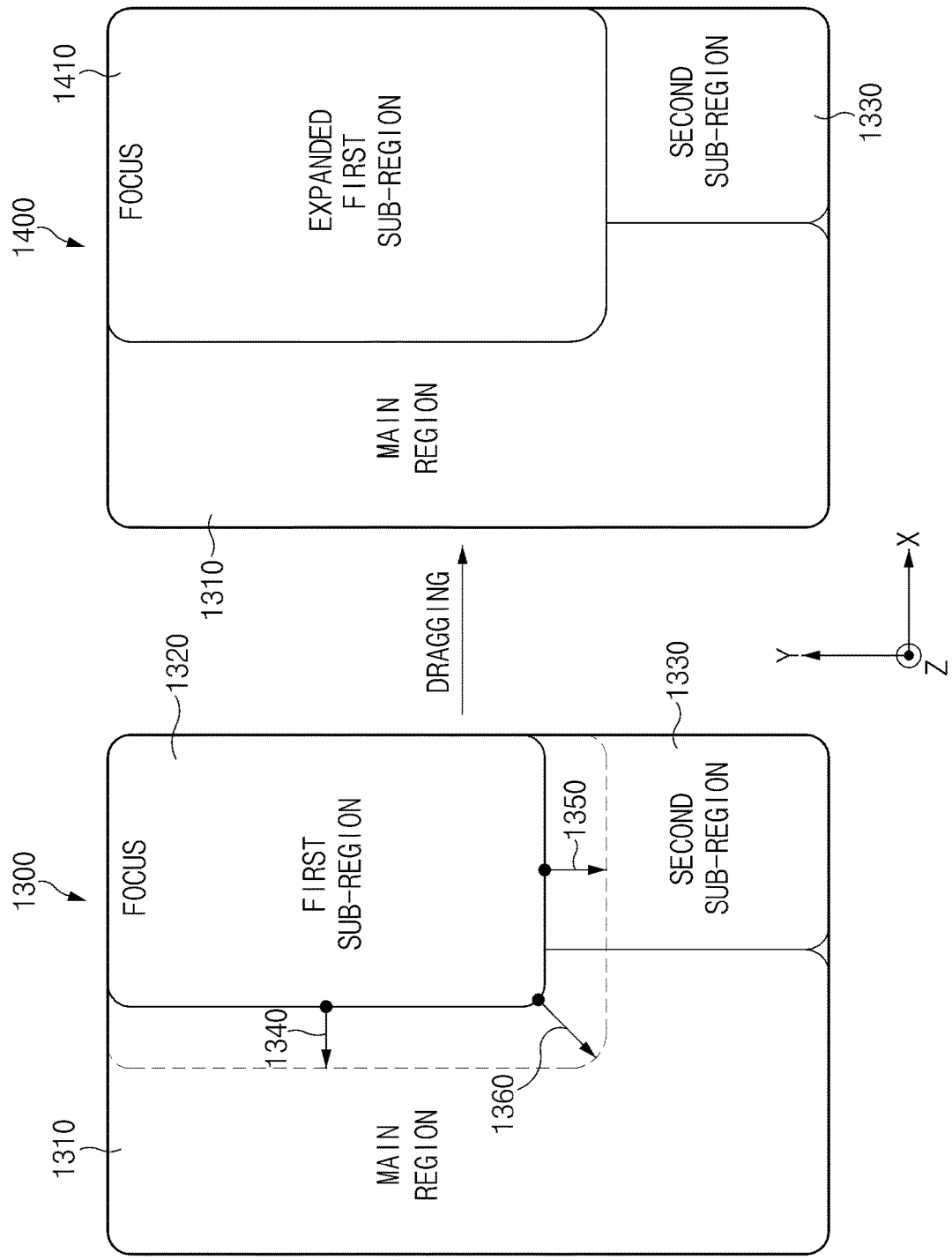
FIG. 13 is a diagram illustrating a process of adjusting a size of an in-focus first sub-region in a display according to yet another embodiment.

FIG. 13 is a diagram illustrating a process of adjusting a size of an in-focus first sub-region 1320 in a display 1300 according to yet another embodiment.

In an embodiment, the display 1300 may include a main region 1310, an in-focus first sub-region 1320, and a second sub-region 1330. The first sub-region 1320 may be brought into focus based on an input of the user to the first sub-region 1320 or an input triggering an event for a second application. The first sub-region 1320 may be expanded to a specified region such that the size thereof is increased compared to the size before being brought into focus.

In an embodiment, the in-focus first sub-region 1320 may have first to third drag portions 1340, 1350, and 1360 that may be dragged. The size of the first sub-region 1320 that has been brought into focus through a gesture of dragging the first to third drag portions 1340, 1350, and 1360 may be enlarged compared to the size before the dragging. For example, after putting a finger or a touch pen on the first to third drag portions 1340, 1350, and 1360, the user may drag the finger or the touch pen outside of the in-focus first sub-region 1320 to enlarge the size of the in-focus first sub-region 1320.

In an embodiment, the first drag portion 1340 may be a side disposed inside the display 1300 and parallel to the first direction (e.g., Y-axis direction), among the edges of the first sub-region 1320. The second drag portion 1350 may be a side disposed inside the display 1300 and parallel to the second direction (e.g., X-axis direction), among the edges of the first sub-region 1320. The third drag portion 1360 may be a vertex inside the display 1300, among vertices of the first sub-region 1320. The third drag portion 1360 may be a point where the first drag portion 1340 and the second drag portion 1350 meet each other.

In an embodiment, the in-focus first sub-region 1320 may be enlarged based on a drag input to at least some of the first to third drag portions 1340, 1350, and 1360. Even if the drag input to some of the first to third drag portions 1340, 1350, and 1360 is performed, the ratio of the length of the in-focus first sub-region 1320 in the second direction to the length in the first direction may be maintained. Accordingly, the display 1400 may display the expanded first sub-region 1410 after the drag input is completed.

In an embodiment, the expanded first sub-region 1410 may have a preset maximum size. The processor may control the expanded first sub-region 1410 so as not to be larger than the maximum size even if the user performs the drag input exceeding the maximum size.

In an embodiment, the size of the expanded first sub-region 1410 may be reduced based on a drag input to at least some of the drag portions. If the drag portion of the expanded first sub-region 1410 is dragged, the expanded first sub-region 1410 may be restored to the same size as the first sub-region 1320. For example, after putting a finger or a touch pen on the inner side or edge of the expanded first sub-region 1410, the user may drag the finger or the touch pen inside of the expanded first sub-region 1410 to reduce the size of the expanded first sub-region 1410. The expanded first sub-region 1410 is dragged may be restored to the same size as the in-focus first sub-region 1320.

In an embodiment, if the in-focus first sub-region 1320 loses the acquired focus, the in-focus first sub-region 1320 may return to the size before the-focus is acquired. If the in-focus first sub-region 1320 loses the acquired focus, the in-focus first sub-region 1320 may be displayed in the same size as the second sub-region 1330.

Figure 14:
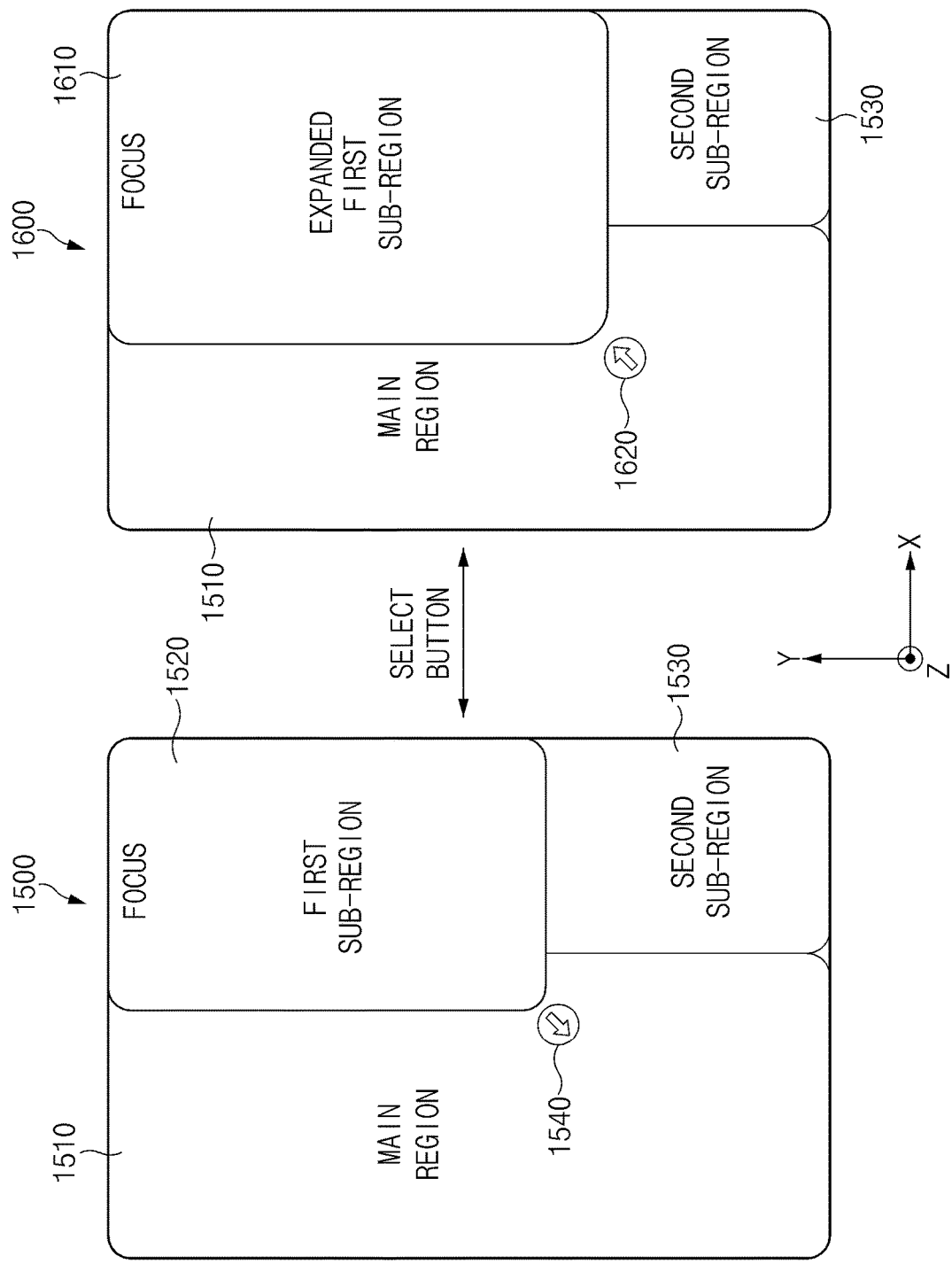
FIG. 14 is a diagram illustrating a process of adjusting a size of an in-focus first sub-region in a display according to yet another embodiment.

FIG. 14 is a diagram illustrating a process of adjusting a size of an in-focus first sub-region 1520 in a display 1500 according to yet another embodiment.

In an embodiment, the display 1500 may include a main region 1510, an in-focus first sub-region 1520, and a second sub-region 1530. The first sub-region 1520 may be brought into focus based on an input of the user to the first sub-region 1520 or an input triggering an event for a second application. The first sub-region 1520 may be expanded to a specified region such that the size thereof is increased compared to the size before being brought into focus.

In an embodiment, a button 1540 may be generated on one side of the in-focus first sub-region 1520. The button 1540 may be generated adjacent to the in-focus first sub-region 1520. For example, the button 1540 may be generated in the inner direction of the display 1500 among the diagonal directions of the in-focus first sub-region 1520. Through a gesture of selecting the button 1540, the size of the in-focus first sub-region 1520 may be further enlarged compared to the size before selecting the button 1540. For example, the user may select the button 1540 by using a finger or a touch pen to enlarge the size of the in-focus first sub-region 1320.

In an embodiment, the in-focus first sub-region 1520 may be enlarged based on a selection input to the button 1540. If the first sub-region 1520 is enlarged based on a selection input for the button 1540, a ratio of the length of the in-focus first sub-region 1520 in the first direction to the length in the second direction may be maintained. Accordingly, the display 1600 may display the expanded first sub-region 1610 after the selection input is completed. The expanded first sub-region 1610 may have a preset maximum size.

In an embodiment, a button 1620 may be generated on one side of the expanded first sub-region 1610. The button 1620 may be generated adjacent to the expanded first sub-region 1610. For example, the button 1620 may be generated in the inner direction of the display 1600 among the diagonal directions of the expanded first sub-region 1610.

In an embodiment, the button 1620 generated on one side of the expanded first sub-region 1610 may be a toggled button of the button 1540 generated on one side of the in-focus first sub-region 1610 that has been brought into focus. Through a gesture of selecting the button 1620 generated on one side of the expanded first sub-region 1610, the size of the expanded first sub-region 1610 may be further reduced compared to the size before selecting the button 1620. For example, the user may select the button 1620 by using a finger or a touch pen to reduce the size of the expanded first sub-region 1610.

In an embodiment, if the in-focus first sub-region 1520 loses the acquired focus, the in-focus first sub-region 1520 may return to a size before the focus is acquired. If the in-focus first sub-region 1520 loses the acquired focus, the in-focus first sub-region 1520 may be displayed in the same size as the second sub-region 1530.

According to various embodiments, an electronic device 101 may include a display (e.g., the display 200 of FIG. 2) and a processor (e.g., the processor 120 of FIG. 1) operationally connected with the display to control the display, where the processor may display a first execution screen corresponding to a first application among a plurality of applications, on a main region (e.g., the main region 210 of FIG. 2), display an execution screen corresponding to a second application among the plurality of applications, on a first sub-region (e.g., the first sub-region 220 of FIG. 2) among a plurality of sub-regions (e.g., the plurality of sub-regions 220 and 230 of FIG. 2) displaying execution screens corresponding to a plurality of applications other than the first application, and increase a size of the first sub-region based on an input to the second application to display the increased first sub-region as an expanded first sub-region (e.g., the expanded first sub-region 240 of FIG. 4), the expanded first sub-region may be overlapped with at least a portion of the main region and/or at least a portion of a second sub-region which is a sub-region other than the first sub-region, and the expanded first sub-region may be visually displayed as an upper layer than the main region and the second sub-region.

In an embodiment, a size of the expanded first sub-region may be larger than a size of the second sub-region and smaller than the main region.

In an embodiment, the plurality of sub-regions may be disposed adjacent to a first edge (e.g., the first edge E1 of FIG. 3) formed in a first direction among edges of the main region, and the first sub-region and the second sub-region may be divided by a second edge (e.g., the second edge E2 of FIG. 3) formed in a second direction perpendicular to the first direction.

In an embodiment, the display may be folded along a first boundary line (e.g., the first boundary line B1 of FIG. 7) across an interior of the main region, and the expanded first sub-region may be formed to cross a second boundary line (e.g., the second boundary line B2 of FIG. 7) to expand toward the main region, the second boundary line being a boundary line between the main region and the second sub-region.

In an embodiment, the expanded first sub-region may be moved such that the expanded first sub-region is not overlapped with an input means (e.g., the keyboard 810 of FIG. 9) if the input means is displayed on the display.

In an embodiment, a disposition relationship of the main region, the first sub-region, and the second sub-region may be adjusted at least partially such that the main region, the first sub-region, and the second sub-region are not overlapped with an input means if the input means is displayed on the display.

In an embodiment, the expanded first sub-region may be set by moving an object (e.g., the object 1140 of FIG. 11) disposed on the display to the first sub-region.

In an embodiment, the first sub-region may further include a drag portion (e.g., the first to third drag portions 1340, 1350, and 1360 of FIG. 13) disposed inside the display after being brought into focus, and may have an enlarged size based on a drag input to at least some of the drag portions.

According to various embodiments, an electronic device may include a display outputting a plurality of execution screens corresponding to a plurality of applications on a plurality of display regions formed by dividing the display into different sizes and a processor operationally connected with the display to control the display, where the processor may bring, into focus, a first sub-region that is a sub-region displaying a second application other than a first application among the plurality of applications, based on an input to the second application, and increase a size of the first sub-region based on an input to the second application to display the increased first sub-region as an expanded first sub-region, and the in-focus first sub-region may be a region in a pointed state based on the input to the second application.

In an embodiment, the processor may be configured to increase a size of the first sub-region to be larger than a size of a second sub-region that is a sub-region other than the first sub-region to display the increased first sub-region as an expanded first sub-region, and the expanded first sub-region may be overlapped with at least a portion of the main region or at least a portion of the second sub-region.

In an embodiment, a notch section may be formed in at least a portion of a bezel region that is an edge region of the display, and the notch section may be disposed adjacent to one edge of the first sub-region.

In an embodiment, the expanded first sub-region may be moved to a region in which a keyboard allowing characters and symbols to be input is not displayed, in an input mode in which the keyboard is displayed on the display.

In an embodiment, a disposition relationship of the main region, the first sub-region, and the second sub-region may be adjusted at least partially such that the main region, the first sub-region, and the second sub-region are not overlapped with a keyboard allowing characters and symbols to be input, in an input mode in which the keyboard is displayed on the display.

According to various embodiments, a method of driving an electronic device may include displaying an execution screen corresponding to a first application among a plurality of applications, on a main region of a display, displaying an execution screen corresponding to a second application among a plurality of sub-regions displaying execution screens corresponding to a plurality of applications other than the first application, on a first sub-region of the display, and increasing a size of the first sub-region based on an input to the second application to display an expanded first sub-region, where the expanded first sub-region may be overlapped with at least a portion of the main region and/or at least a portion of a second sub-region which is a sub-region other than the first sub-region, and the expanded first sub-region may be visually displayed as an upper layer than the main region and the second sub-region.

The electronic device according to various embodiments may be one or various types of electronic devices. The electronic devices may include, for example, a portable communication device (e.g., smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different older or omitted, or one of more other operations may be added.

The invention claimed is:

1. An electronic device comprising:
   a display outputting a plurality of execution screens corresponding to a plurality of applications on a plurality of display regions formed by dividing the display into different sizes including on a main region of the plurality of display regions, and a first execution screen corresponding to a first application; and
   a processor operationally connected with the display to control the display,
   wherein the processor:
      brings, into focus, a first sub-region which is a sub-region displaying a second application other than the first application among the plurality of applications, based on dragging an object that is inside the main region to inside of the first sub-region, and
      increases a size of the first sub-region in response to dragging the object that is inside the main region to the inside of the first sub-region to display the first sub-region as an expanded first sub-region with a predetermined size, and
   the in-focused first sub-region being a region in a pointed state based on dragging the object that is inside the main region to the inside of the first sub-region.

2. The electronic device of claim 1, wherein the predetermined size is larger than a size of a second sub-region that is a sub-region other than the first sub-region, and the increasing of the size of the first sub-region to the predetermined size causes the first sub-region to overlap with at least a portion of the main region or at least a portion of the second sub-region.

3. The electronic device of claim 1, wherein the first sub-region and a second sub-region are disposed adjacent to a first edge formed in a first direction among edges of the main region, and are divided by a second edge formed in a second direction perpendicular to the first direction.

4. The electronic device of claim 1, wherein a notch section is formed in at least a portion of a bezel region that is an edge region of the display, and the notch section is disposed adjacent to one edge of the first sub-region.

5. The electronic device of claim 1, wherein the display is folded along a first boundary line across an interior of a main region, and the expanded first sub-region is formed to cross a second boundary line to expand toward the main region, the second boundary line being a boundary line between the main region and a second sub-region.

6. The electronic device of claim 2, wherein the expanded first sub-region is moved to a region in which a keyboard allowing characters and symbols to be input is not displayed, in an input mode in which the keyboard is displayed on the display.

7. The electronic device of claim 1, wherein a disposition relationship of the main region, the first sub-region, and a second sub-region is adjusted at least partially such that the main region, the first sub-region, and the second sub-region are not overlapped with a keyboard allowing characters and symbols to be input, in an input mode in which the keyboard is displayed on the display.

8. A non-transitory computer-readable medium storing a plurality of executable instructions, wherein execution of the plurality of executable instructions by a processor causes the processor to perform a plurality of operations, wherein the plurality of operations comprises:

controlling a display to output a plurality of execution screens corresponding to a plurality of applications on a plurality of display regions formed by dividing the display into different sizes including on a main region of the plurality of display regions, and a first execution screen corresponding to a first application; and bringing, into focus, a first sub-region which is a sub-region displaying a second application other than the first application among the plurality of applications, based on dragging an object that is inside the main region to inside of the first sub-region, and increasing a size of the first sub-region in response to dragging the object that is inside the main region to the inside of the first sub-region to display the first sub-region as an expanded first sub-region with a predetermined size, and wherein the in-focused first sub-region is a region in a pointed state based on dragging the object that is inside the main region to the inside of the first sub-region.

9. The non-transitory computer-readable medium of claim 8, wherein the predetermined size is larger than a size of a second sub-region that is a sub-region other than the first sub-region, and the increasing of the size of the first sub-region to the predetermined size causes the first sub-region to overlap with at least a portion of the main region or at least a portion of the second sub-region.

10. The non-transitory computer-readable medium of claim 8, wherein the first sub-region and a second sub-region are disposed adjacent to a first edge formed in a first direction among edges of the main region, and are divided by a second edge formed in a second direction perpendicular to the first direction.

* * * * *